United States Patent
Medina, III et al.

(10) Patent No.: US 11,544,397 B1
(45) Date of Patent: *Jan. 3, 2023

(54) SYSTEMS AND METHODS FOR SENDING AND RECEIVING ENCRYPTED SUBMESSAGES

(71) Applicant: United Services Automobile Association (USAA), San Antonio, TX (US)

(72) Inventors: Reynaldo Medina, III, San Antonio, TX (US); Arthur Smith, Fredericksburg, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 55 days.

This patent is subject to a terminal disclaimer.

(21) Appl. No.: 16/931,053

(22) Filed: Jul. 16, 2020

Related U.S. Application Data (63) Continuation of application No. 16/231,221, filed on Dec. 21, 2018, now Pat. No. 10,719,620, which is a
(Continued)

(51) Int. Cl.
*G06F 21/62* (2013.01)
*H04L 9/40* (2022.01)
(Continued)

(52) U.S. Cl.
CPC ........ *G06F 21/6218* (2013.01); *G06F 21/602* (2013.01); *H04L 9/0618* (2013.01);
(Continued)

(58) Field of Classification Search
None
See application file for complete search history.

(56) References Cited

U.S. PATENT DOCUMENTS

| 4,802,220 A | 1/1989 | Marker, Jr. |
| 5,594,869 A | 1/1997 | Hawe et al. |
| (Continued) | | |

FOREIGN PATENT DOCUMENTS

JP    5837625 B2 *  12/2015

OTHER PUBLICATIONS

Rivest, "Chaffing and Winnowing: Confidentiality without Encryption", Pub. Date: 1998, pp. 1-6.
(Continued)

*Primary Examiner* — Michael Pyzocha
(74) *Attorney, Agent, or Firm* — BakerHostetler (57) ABSTRACT

Systems and methods are provided for sending and receiving encrypted submessages. Messages could be partitioned into a plurality of submessages based on the content of a message, and such submessages could be individually encrypted and sent over a network. The partitioning could be based on various standards and/or heuristics. In the sending process, submessages could be designated to travel over different networks and networks of different types. Such submessages could then be received and reassembled in spite containing overlapping content with respect to each other, having to contend with copies of submessages, and having accompanying related content (e.g., advertisements) and non-related content (e.g., random bits). Moreover, the sending process could also be performed in real time or in a batched manner, depending on the implementation.

22 Claims, 8 Drawing Sheets

Related U.S. Application Data continuation of application No. 12/101,025, filed on Apr. 10, 2008, now Pat. No. 10,169,598.

(51) Int. Cl.
  *H04L 9/14*   (2006.01)
  *G06F 21/60*  (2013.01)
  *H04L 9/06*   (2006.01)
  *H04L 45/00*  (2022.01)

(52) U.S. Cl.
  CPC .............. *H04L 9/14* (2013.01); *H04L 45/00* (2013.01); *H04L 63/0428* (2013.01); *H04L 63/18* (2013.01); *G06F 2221/2107* (2013.01)

(56) References Cited

U.S. PATENT DOCUMENTS

| | | | |
|---|---|---|---|
| 5,960,080 | A | 9/1999 | Fahlman et al. |
| 6,091,714 | A | 7/2000 | Sensel et al. |
| 6,122,743 | A | 9/2000 | Shaffer et al. |
| 6,598,161 | B1 | 7/2003 | Kluttz et al. |
| 6,614,370 | B2 | 9/2003 | Gottesman |
| 6,771,597 | B2 | 8/2004 | Makansi et al. |
| 6,957,349 | B1 | 10/2005 | Yasukura |
| 7,032,224 | B2 | 4/2006 | Kadakia et al. |
| 7,450,717 | B1 | 11/2008 | Sprunk et al. |
| 7,650,628 | B2 | 1/2010 | Zimmerman et al. |
| 2001/0055387 | A1 | 12/2001 | Suzuki et al. |
| 2002/0101369 | A1 | 8/2002 | Gottesman |
| 2002/0120874 | A1 | 8/2002 | Shu et al. |
| 2002/0144153 | A1 | 10/2002 | LeVine et al. |
| 2002/0147769 | A1 | 10/2002 | Levitan |
| 2002/0154631 | A1* | 10/2002 | Makansi ................. H04L 63/18 370/389 |
| 2003/0069881 | A1 | 4/2003 | Huttunen |
| 2003/0126303 | A1 | 7/2003 | Kadakia et al. |
| 2003/0167314 | A1 | 9/2003 | Gilbert et al. |
| 2004/0059908 | A1* | 3/2004 | Yamada ................. H04L 9/003 713/151 |
| 2004/0162076 | A1* | 8/2004 | Chowdry ............ H04L 63/0281 455/445 |
| 2006/0117173 | A1 | 6/2006 | Deblock et al. |
| 2006/0129811 | A1 | 6/2006 | Fiske |
| 2006/0274856 | A1* | 12/2006 | Dunn .................... H04L 9/0825 375/316 |
| 2007/0106735 | A1 | 5/2007 | Hardy |
| 2007/0122004 | A1 | 5/2007 | Brown et al. |
| 2007/0156777 | A1 | 7/2007 | Wolff et al. |
| 2007/0240224 | A1* | 10/2007 | Agrawal ........... G06F 16/24532 726/25 |
| 2008/0098481 | A1* | 4/2008 | Lee ....................... H04L 9/0825 726/26 |
| 2008/0222734 | A1 | 9/2008 | Redlich et al. |
| 2009/0083366 | A1* | 3/2009 | Roantree ............... G06F 21/606 709/202 |
| 2009/0224884 | A1* | 9/2009 | Tuttle .................. H04W 12/033 340/10.1 |
| 2010/0061550 | A1* | 3/2010 | Nakamura .............. H04L 9/065 380/44 |
| 2010/0077483 | A1 | 3/2010 | Stolfo |
| 2010/0241759 | A1 | 9/2010 | Smith et al. |
| 2014/0122876 | A1* | 5/2014 | Johnson ................. H04L 69/14 713/168 |

OTHER PUBLICATIONS

Pv6—Wikipedia, the free encyclopedia, http://en.wikipedia.org/wiki/1Pv6, Apr. 7, 2008.

Gianluca Insolvibile, "The IP Security Protocol, Part 1," Published on Linux Journal (http://www.inuxjournal.com), Sep. 8, 2002, pp. 1-6.

Mark Muegge, "Encrypton Issues: Moving Toward Higher Performance Network Security Subsystems," The Free Library, Science and Technology, Computer Technology Review, Oct. 1, 1999, pp. 1-4.

Psec—Wikipedia, the free encyclopedia, http://en.wikipedia.org/wiki/IPsec, Apr. 7, 2008, pp. 1-8.

\* cited by examiner

SYSTEMS AND METHODS FOR SENDING AND RECEIVING ENCRYPTED SUBMESSAGES

CROSS-REFERENCE TO RELATED APPLICATION

This application is a continuation of U.S. patent application Ser. No. 16/231,221, filed Dec. 21, 2018, and issued on Jun. 30, 2020, as U.S. Pat. No. 10,719,620, which is a continuation of U.S. patent application Ser. No. 12/101,025, filed Apr. 10, 2008, and issued on Jan. 1, 2019, as U.S. Pat. No. 10,169,598, which is hereby incorporated by reference herein in its entirety.

The presently disclosed subject matter is related to the following applications: U.S. patent application Ser. No. 12/101,022 filed Apr. 10, 2008, entitled "Systems and Methods For Sending and Receiving Encrypted Submessages," and U.S. patent application Ser. No. 12/101,034, filed Apr. 10, 2008, entitled "Systems and Methods For Sending and Receiving Encrypted Submessages, which are incorporated by reference in their entirety.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2008, USAA.

FIELD OF THE INVENTION

The present subject matter relates to the field of computing devices, and more particularly, to methods and systems for communicating encrypted Submessages, although such methods and systems correspond to merely an exemplary and non-limiting filed of the presently disclosed subject matter.

BACKGROUND OF THE INVENTION

In an economy increasingly based on electronic transactions, security regarding such transactions is paramount. Current security systems encrypt entire messages and then split them up into packets to be sent over a network. However, this solution does not provide the most secure manner of communicating such messages. There is a need in the art to encrypt messages on a finer level of granularity (and on considerations other than the message itself).

SUMMARY OF THE INVENTION

Systems and methods are provided for sending and receiving encrypted submessages. Messages could be partitioned into a plurality of submessages based on the content of a message, and such submessages could be individually encrypted and sent over a network. The partitioning could be based on various standards and/or heuristics. In the sending process, submessages could be designated to travel over different networks and networks of different types. Such submessages could then be received and reassembled in spite containing overlapping content with respect to each other, having to contend with copies of submessages, and having accompanying related content (e.g., advertisements) and non-related content (e.g., random bits). Moreover, the sending process could also be performed in real time or in a batched manner, depending on the implementation.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. The following figures are included.

DETAILED DESCRIPTION OF ILLUSTRATIVE EMBODIMENTS

Exemplary Aspects of Sending and Receiving Encrypted Submessages

Figure 1:
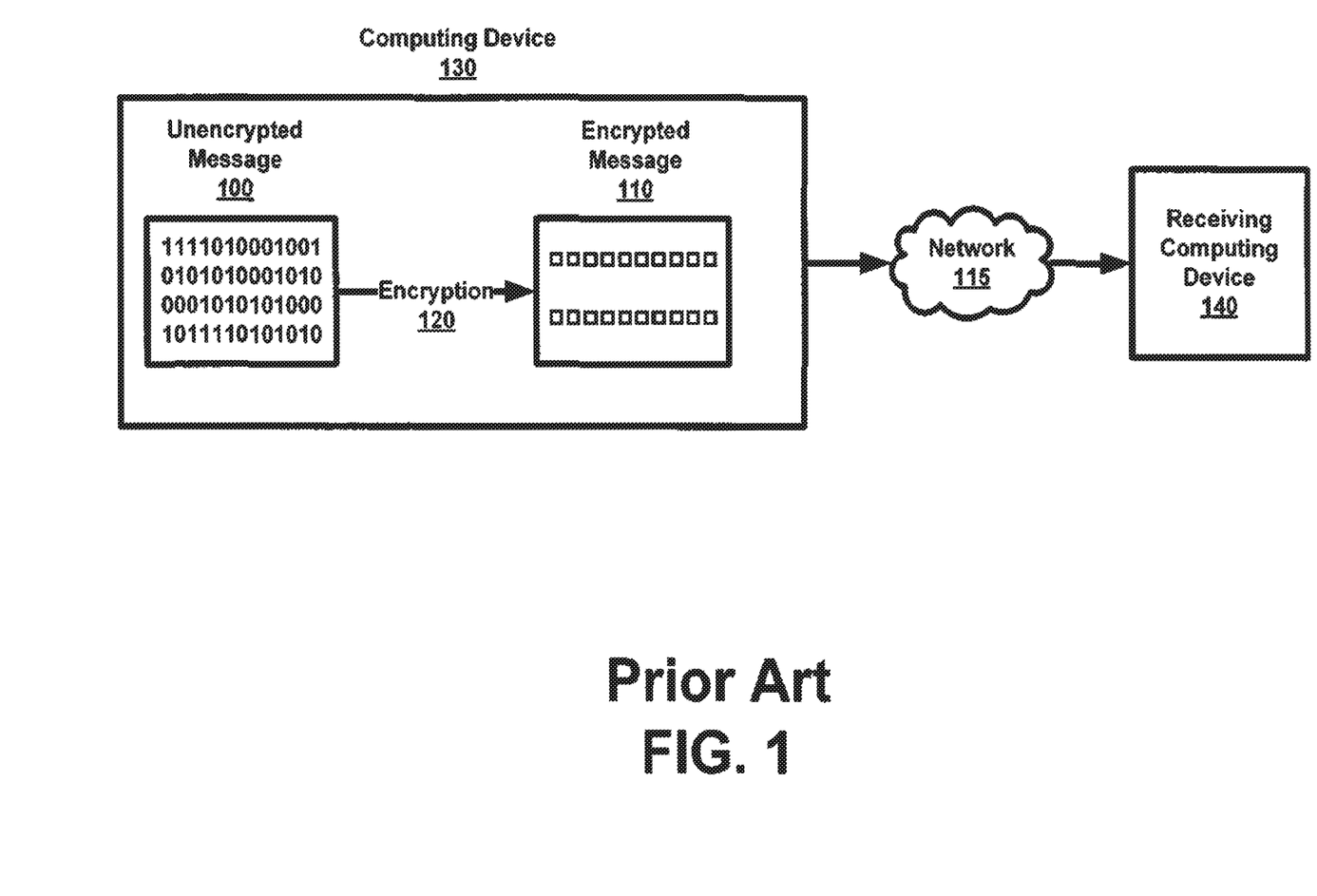
FIG. 1 illustrates a prior art system for sending encrypted messages.

FIG. 1 illustrates a prior art system for sending encrypted messages. In this system, a computing device 130 can take an unencrypted message 100 and encrypt it 120 using well known encryption algorithms into an encrypted message 110. In this system, the entire message, whether it be an email, a file, a text message, and the like, would be encrypted and sent over a network 115 to a receiving computing device 140.

Figure 2:
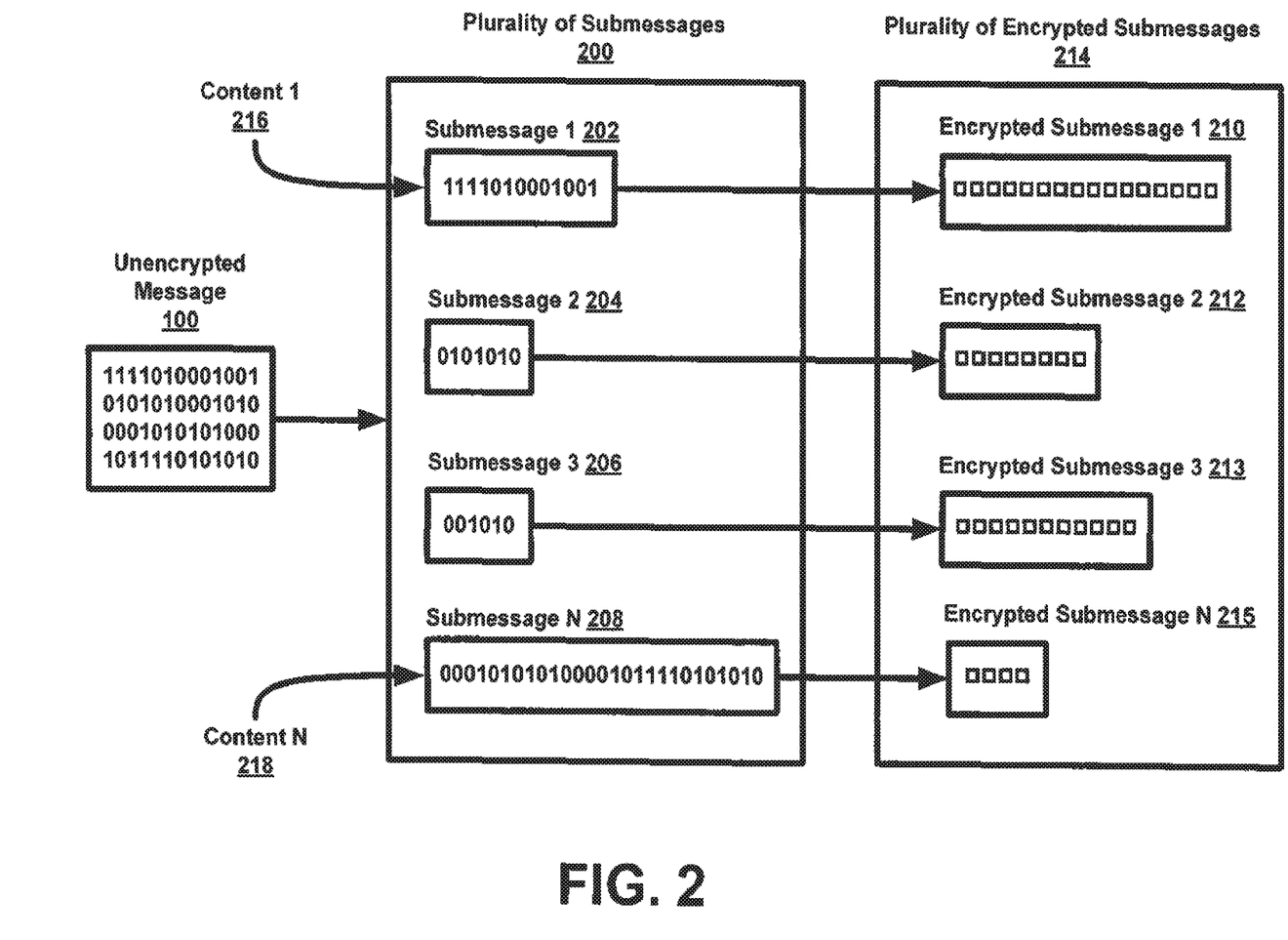
FIG. 2 illustrates that a message does not have to be encrypted as a whole, but rather the messages can be divided into a plurality of submessages, and these submessages can be individually encrypted.

In contrast to FIG. 1, FIG. 2 illustrates that a message does not have to be encrypted as a whole, but rather the messages can be divided into a plurality of submessages, and these submessages can be individually encrypted. Thus, per FIG. 2, an unencrypted message 100 can be divided into a plurality of submessages 200, such as submessage 1 202, submessage 2 204, submessage 3 206, and submessage N 208. Each of these submessages 202, 204, 206, 208 can be divided according to various standards and/or heuristics. For example, the message 100 could be divided in terms of content 216, 218. If the message is a file comprising subject matter concerning clients and servers, a first submessage could contain subject matter on clients and a second submessage could contain subject matter on servers.

In the alternative, if the message is an email, it could be divided by the to-address, from-address, subject, body, and so on. Depending the nature of the message, it may be divided along different lines and considerations. For example, if the message is a word processing document, it could be divided into a submessage containing the body of the document and into another submessage containing confidential comments about such a document (or, in the alternative, metadata related to the document).

Turning back to FIG. 2, a first unencrypted submessage 202 could be encrypted into a corresponding encrypted submessage 210. This can be performed for any of the other (or a subset thereof) submessages 204, 206, 208. (It should be noted that different encryption algorithms could be used for each or a subset of submessages; in the alternative, the same encryption algorithm could be used for all submessages).

Figure 3:
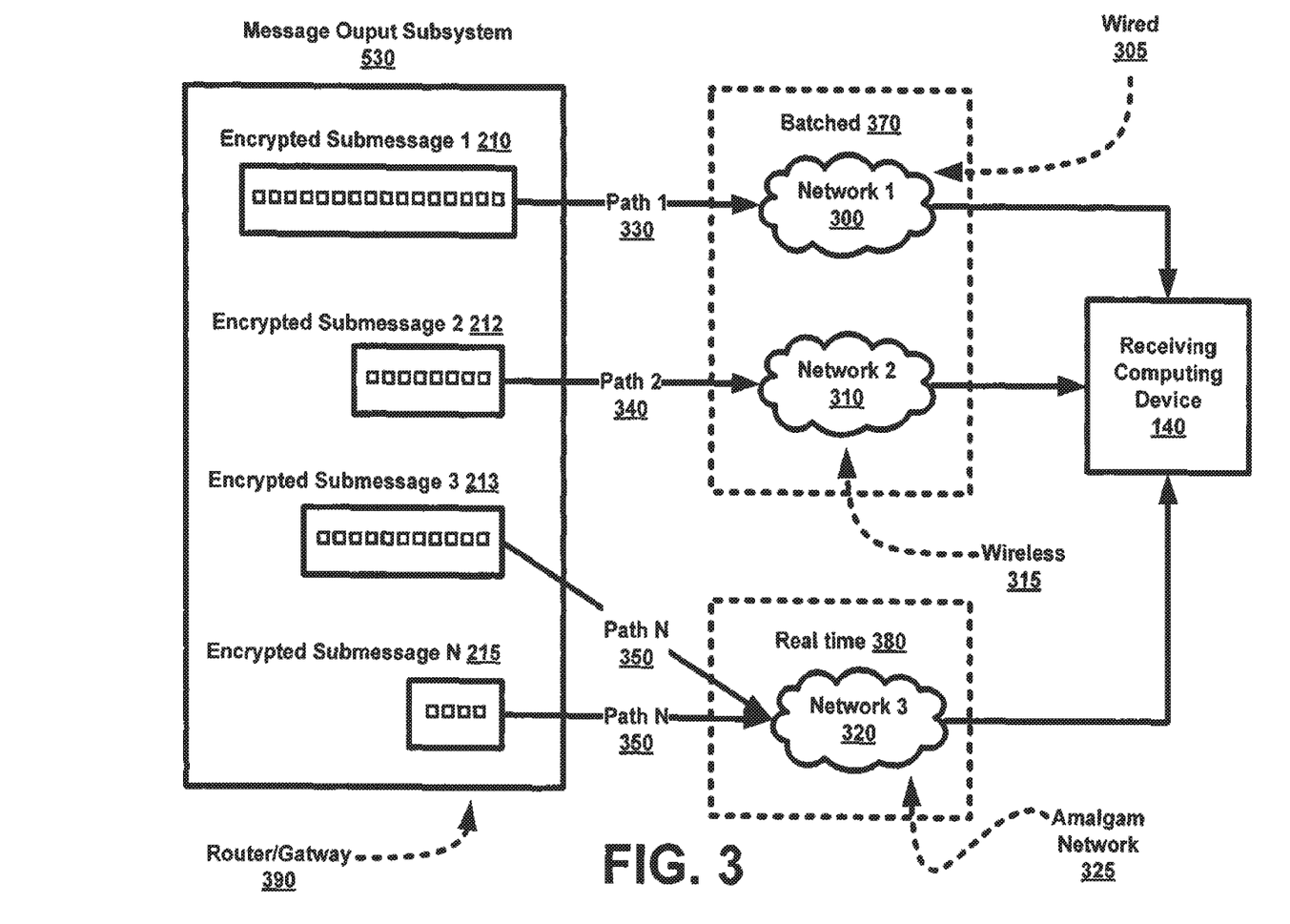
FIG. 3 illustrates the manner in which encrypted submessages could be sent.

Once the submessages of interest are encrypted, they can be forwarded to a message output subsystem. Thus, FIG. 3 illustrates the manner in which encrypted submessages could be sent. A message output subsystem 530 can contain a plurality of encrypted submessages 210, 212, 213, 215. Each of these submessages can be sent over a different path 330, 340, 350, 360.

Thus, in one aspect of the present disclosure, a first encrypted submessage 210 can be sent over a first path 330 to a receiving computing device 140. Similarly, a second encrypted submessage 212 can be sent over a second path 340 to the receiving computing device 140, and so on. The two paths 330, 340 can correspond to different networks, such as network 1 300 and network 2 310. In one aspect of the present disclosure, the two networks 300, 310 can be network of different type, such as a wired network and a wireless networks. The encrypted submessages can indicate via header information or other mechanisms that they should be sent over their respective and designated networks. However, in other aspects, to the extent this solution is not feasible, the message output subsystem 530 can at least ensure that such submessages will be sent over different networks (yet, perhaps later downstream from the message output subsystem 530, such submessages may travel over similar or even the same networks before they reach the receiving computing device 140). It should be noted that the relationship between the message output subsystem 530 (which can reside on a computing device or on a router/gateway 390) to the receiving computing device 140 may that of a client to a server, or vice-versa, or these computing devices can operate in a distributed computing environment.

In FIG. 3, certain encrypted submessages 213, 215 can also be designated to be sent over the same path 350. Thus, given any number of submessages, some may be specifically designated to be sent over different networks 300, 310, yet others may be designated (or allowed by default) to be sent over the same network 320. Moreover, any of the depicted networks could be single-type networks, such as only wireless networks 305 or only wired networks 315, or they can be amalgams 325 of different types of networks, such as a wireless and a wired network.

Figure 4:
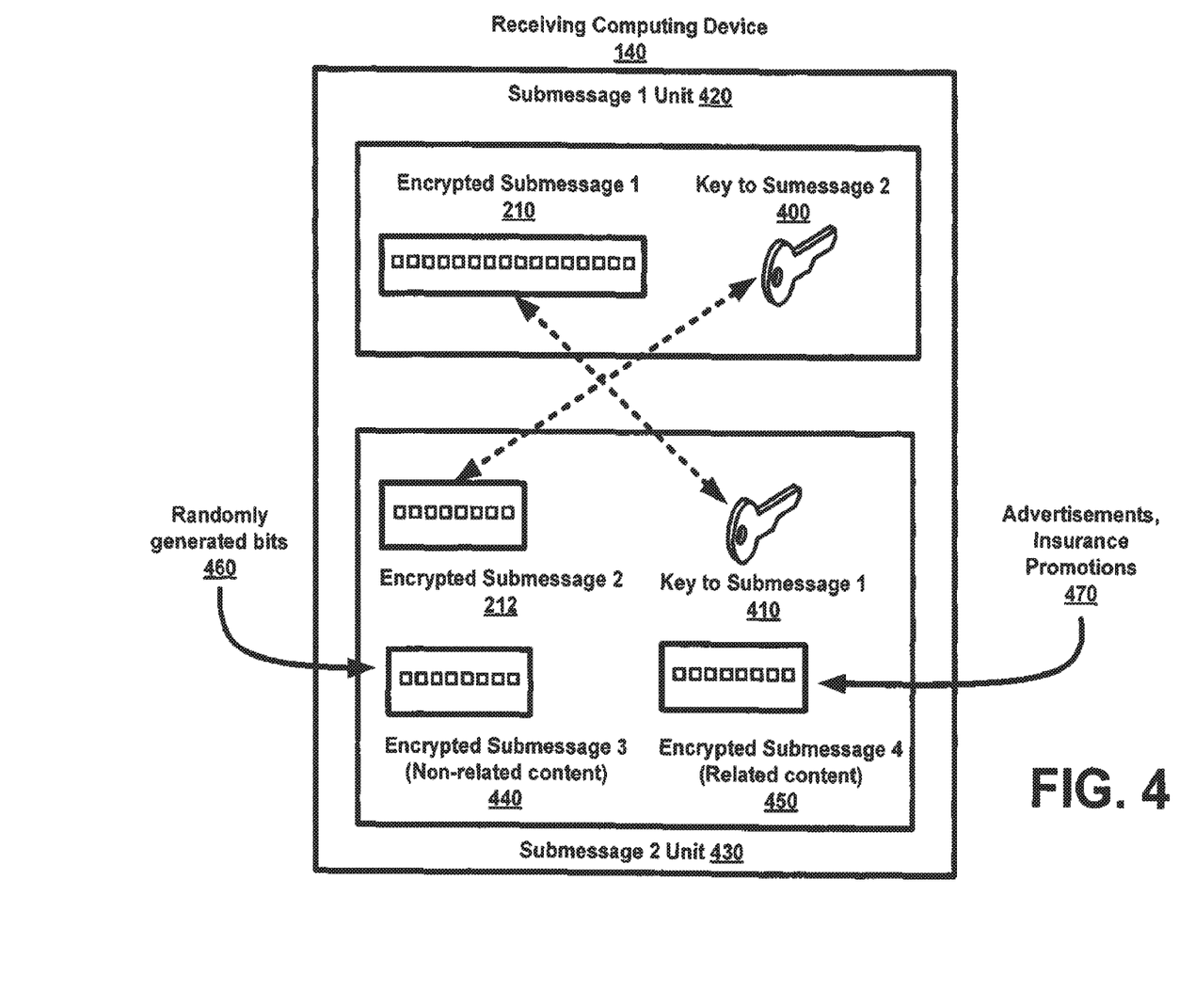
FIG. 4 illustrates that encrypted submessages can be (sent and) received in submessage units containing encrypted submessages and keys corresponding to different submessages in different submessage units?

Next, FIG. 4 illustrates that encrypted submessages can be (sent and) received in submessage units containing encrypted submessages and keys corresponding to different submessages in different submessage units. Thus, a receiving computing device (in the alternative, a sending computing device could be used herein also) receives a first submessage unit 420 and a second submessage unit 430. The first submessage unit 420 can contain a first encrypted submessage 210 along with a key 400 to a second submessage 212. Similarly, a second submessage unit 430 can contain a second encrypted submessage 212 along with a key 410 to a first submessage 210. This can increase the security of the message 100 that is being sent.

It should also be noted that FIG. 4 (as do all the figures illustrated herein) shows only exemplary and non-limiting aspects of the disclosed subject matter. Thus, any of the submessage units 420, 430 can contain a plurality of submessages and keys in various ratios: one-to-one, one-to-many, or many-to-one.

Furthermore, FIG. 4 illustrates that various submessage units 430 could contain not only submessages that have content related to the original message 100, but also submessages with non-related content to the message 100. (In the alternative, on a different level of granularity, each individual submessage could contain both related and non-related content). Such non-related content could comprise randomly generated bits n order to confuse any party wanting to intercept such content. The related and non-related content could be intertwined such that it would be difficult to tell which is which. A key could be sent (over a different path and/or at a different time) letting the receiving computing device 140 know how to separate the two types of content.

Just as the submessage units 430 can contain non-related content, they could just as advantageously contain related content in a separate submessage 450. For example, if the original message 100 is an email about insurance, the related content could comprise insurance advertisements and/or promotions 470. Any of the aspects mentioned so far could be assembled in various combinations with each other, thus no aspect is meant to illustrate any limiting manner in which the presently disclosed subject matter can be implemented.

Figure 5:
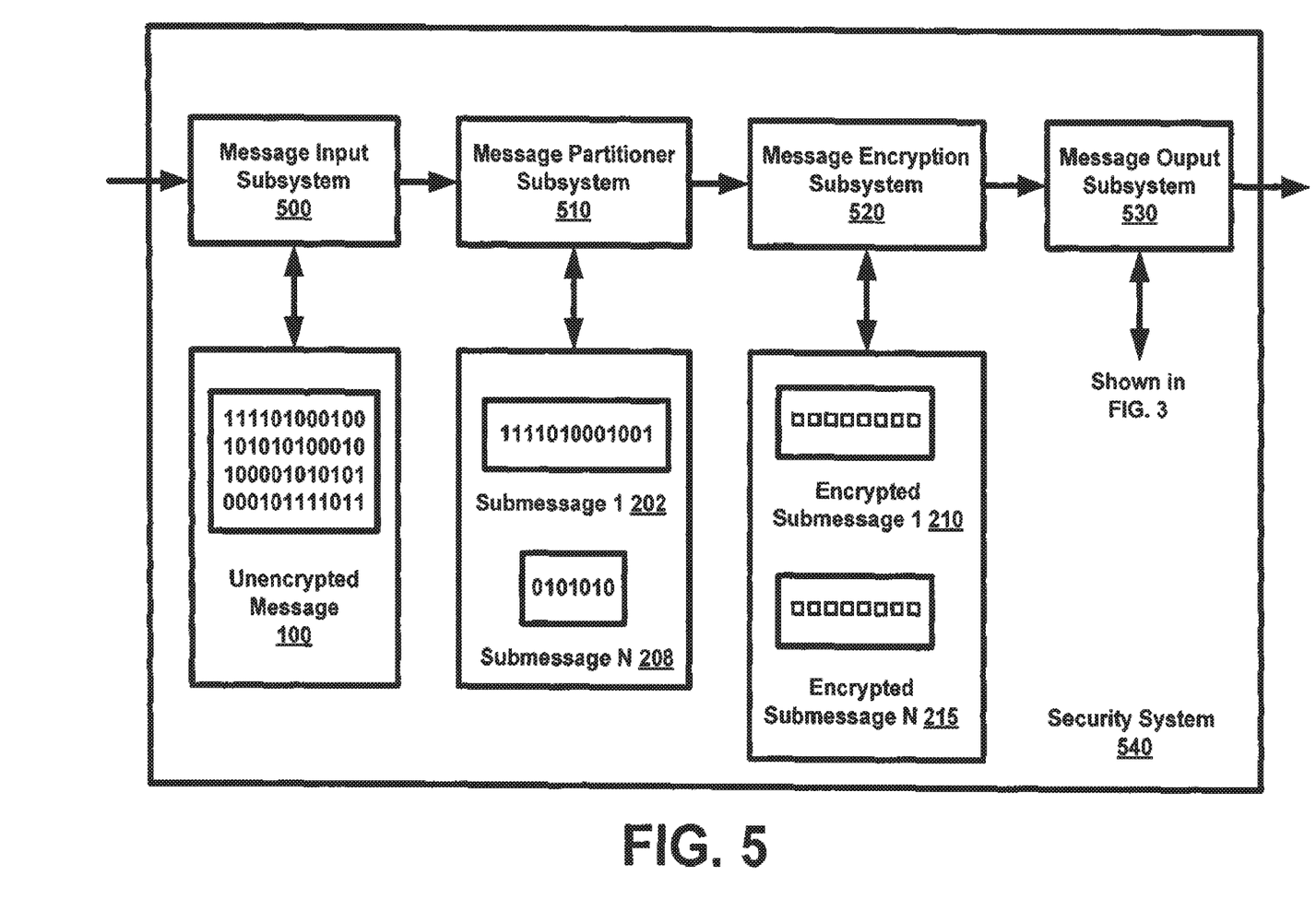
FIG. 5 illustrates a security system that can perform at least any of the functions described with respect to FIGS. 2, 3, and 4, including dividing messages into submessages and sending such submessages over designated paths.

FIG. 5 illustrates a security system that can perform at least any of the functions described with respect to FIGS. 2, 3, and 4, including dividing messages into submessages and sending such submessages over designated paths. In FIG. 5, a security system 540 is shown that comprises a message input subsystem 500, a message partitioner subsystem 510, a message encryption subsystem 520, and a message output subsystem 530. The message input subsystem 500 can receive an unencrypted message 100, process it (e.g. putting it in the correct queue), and then pass it along to the message partitioner subsystem 510. This subsystem 510, in turn, can partition the message 100 into a plurality of submessages 202, 215 according to the various standards and/or heuristics mentioned above. Once such submessages 202, 205 are partitioned, they can be provided to the message encryption subsystem 520.

Thus, shown first submessage 202 can be encrypted into a first encrypted message 210, and the last submessage 208 can be encrypted into the last encrypted submessage 215. Once this task is complete, the results can be forwarded to the message output subsystem 530 that was discussed above with reference to FIG. 3.

Figure 6:
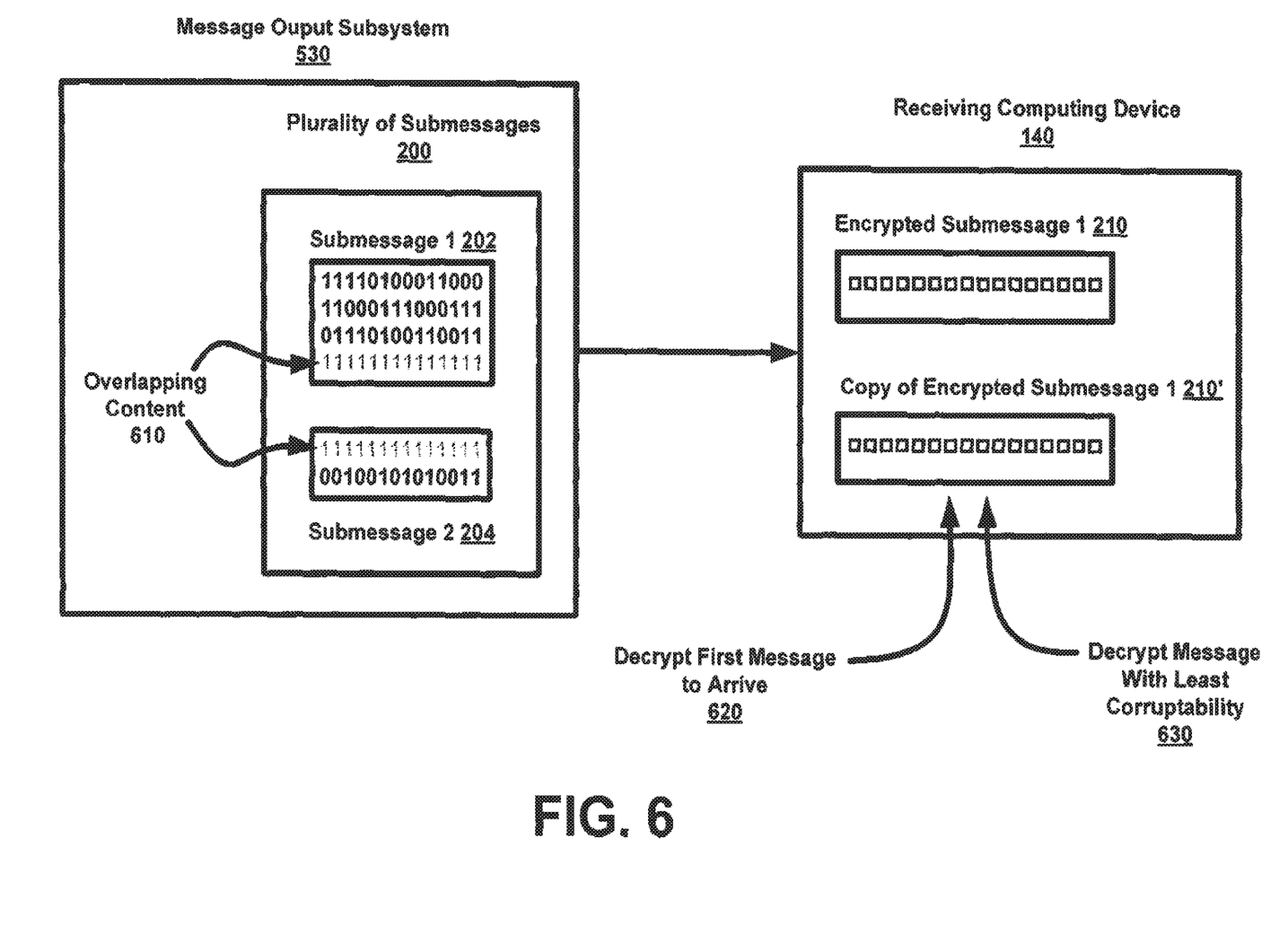
FIG. 6 illustrates that various security systems and subsystems considered so far can contain various refinements and accommodate various scenarios, such as content overlap and submessage copies.

The various security systems and subsystems considered so far can contain various refinements and accommodate various scenarios. For example, FIG. 6 illustrates that in the message output subsystem 530, which may contain a plurality of submessages 200, some submessages, such as a first submessage 202 and a second submessage 204 can overlap in content 610. Such redundancy may improve the integrity of data once it arrives at the receiving computing device 140. Hence, submessages, even though originally partitioned along content boundaries, may still contain overlapping content and be reassembled at the receiving computing device 140 to construct the original message 100 (without reproducing any redundant content).

In another aspect of the presently disclosed subject matter, the receiving computing device 140 can receive not only the original encrypted submessages 210 that were sent from the message output subsystem 530, but also any copies of such submessages 210'. Such submessage redundancy (to be distinguished from content redundancy, discussed above), can allow for better information fidelity. In one aspect of the presently disclosed subject matter, anyone of the original submessage 210 and the copy 210' can be decrypted, depending on which arrives first 620 or which is least corrupted 630.

By way of summary giving several exemplary systems, such systems can be used to improve the security of communicated submessages. These systems can be practiced as methods or implemented in computer executable instructions stored on computer readable media. Hence, the following discussion of exemplary and non-limiting systems should not be limited just to such systems, but rather it should extend to any methods, media, etc.* that may apply.

For example, a system could be configured for augmenting the security of a computing environment. Such a system could be further configured to: receive at least one message; divide the at least one message into a plurality of submessages based on the content of the at least one message; individually encrypt each submessage of the plurality of submessages; and, send at least one of the encrypted submessages that has been individually encrypted. As was indicated above, at least two of the plurality of submessages could overlap in content, and at least one of the encrypted submessages could be accompanied by non-related content to the content of an original message. The non-related content could correspond to randomly generated bits. In the alternative, at least one of the plurality of submessages could be accompanied by related content to the content of the original message. The related content could correspond to at least one of advertisements and insurance promotions. Lastly, any of the encrypted submessages could be sent in a batched manner or in real time on an individual-by-individual submessage.

For example, a system could be used or manufactured for controlling paths of messages over a plurality of networks. Such as system could be configured to: receive at least two encrypted submessages out of a plurality of encrypted submessages, where the plurality of encrypted submessages can be generated from at least one message based on the content of the at least one message; designate a first path of a first encrypted submessage of the two encrypted submessages over a first network; designate a second path of a second encrypted submessage of the two encrypted submessages over a second network; and, ensure that at a sending point the first network is different from the second network.

In this system, some subsystem could be configured to send a copy of at least one of the first encrypted submessage and the second encrypted submessage over a third network. The first network is could be a wired network, the second network could be a wireless network 315, or some combination (or amalgamation thereof), and the third network could be different in type from the other networks (yet in some aspects, it could be the same or similar). This same subsystem (or different subsystem) could further be configured to ensure that at a sending point (e.g. the message output subsystem, discussed above) the first network can be different from the second network (where the output system can reside on a router/gateway). Over whichever networks such submessages are finally sent, in any case they could be sent in a batched manner and/or in real time.

In the last example, a system could be implemented for increasing the security of content sent over a networked computing environment. Such as system could be configured to: receive a first encrypted submessage created from a full message based on at least one content criteria; receive a first key associated with the first encrypted submessage, where the first key could be configured to decrypt the first encrypted submessage; receive a second encrypted submessage created from at least the full message; receive a second key associated with the second encrypted submessage, where the second key could be configured to decrypt the second encrypted submessage; receive the first key along with the second encrypted submessage over a first network as a first submessage unit; and, receive the second key along with the first encrypted submessage over a second network as a second submessage unit.

This system could further comprise a subsystem configured to receive the first key, the second encrypted submessage, the second key, and the first encrypted submessage, and decrypt the first encrypted submessage with the first key and the second encrypted submessage with the second key. In another aspect, another subsystem could be configured to identify the second encrypted submessage and differentiate the second encrypted submessage from the submessage having non-related content to the full message. In still another aspect, another subsystem could be configured to reconstruct at least in part the full massage from at least the first encrypted submessage and the second encrypted submessage when the first encrypted submessage and the second encrypted submessage have overlapping content.

In other aspects, a subsystem could be configured to receive the first encrypted submessage and a copy of the first encrypted submessage, and then decrypt the first to arrive submessage of the first encrypted submessage and the copy of the first encrypted submessage. In still other aspects, a subsystem could be configured to receive the first encrypted submessage and a copy of the first encrypted submessage, and the decrypt a submessage with the least corruptibility of the first encrypted submessage and the copy of the first encrypted submessage. Finally, in some aspects, a first submessage unit and a second submessage unit could be received over a first network that could be a wired network and over a second network that could be a wireless network, respectively.

It should be noted that the various aspects of the presently disclosed subject matter could be implemented in various combinations of the components discussed with reference to FIGS. 2-6, on various computing devices discussed with reference to FIG. 7, communicating over various networks discussed with reference to FIG. 8.

Figure 7:
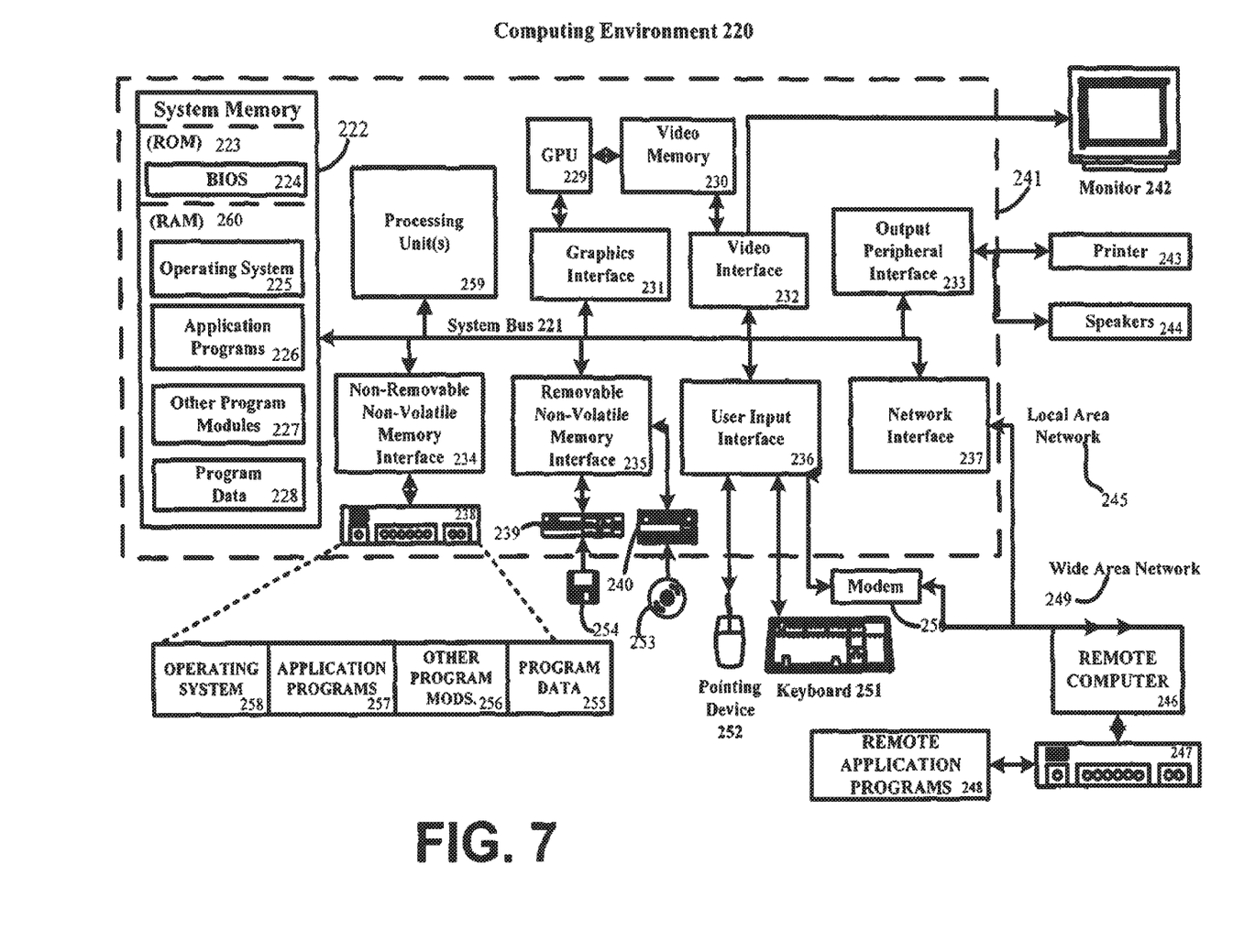
FIG. 7 illustrates a block diagram representing an exemplary computing device environment suitable for use in conjunction with the presently disclosed aspects.

Exemplary Computing and Networking Environments for Sending and Receiving Submessages No Referring to FIG. 7, shown is a block diagram representing an exemplary computing device suitable for use in conjunction with implementing the subject matter described above. For example, the computer executable instructions that carry out the processes and methods for sending and receiving submessages can reside and/or be executed in such a computing environment as shown in FIG. 7. The computing devices described above can also be implemented using any of the components discussed with respect to FIG. 7, and they can be connected using any of the components discussed with respect to FIG. 8.

The computing system environment 220 is only one example of a suitable computing environment and s not intended to suggest any limitation as to the scope of use or functionality of the presently disclosed subject matter. Neither should the computing environment 220 be interpreted as having any dependency or requirement relating to any one or combination of components illustrated in the exemplary operating environment 220.

Aspects of the presently disclosed subject matter can be operational with numerous other general purpose or special purpose computing system environments or configurations. Examples of well known computing systems, environments, and/or configurations that can be suitable for use with the presently disclosed subject matter include, but are not limited to, personal computers, server computers, hand-held or laptop devices, multiprocessor systems, microprocessor-based systems, set top boxes, programmable consumer electronics, network PCs, minicomputers, mainframe computers* distributed computing environments that include any of the above systems or devices, and the like.

Aspects of the presently disclosed subject matter can be implemented in the general context of computer-executable instructions, such as program modules, being executed by a computer. Generally, program modules can include routines, programs, objects, components, data structures, etc., that perform particular tasks or implement particular abstract data types. Aspects of the presently disclosed subject matter can also be practiced in distributed computing environments where tasks are performed by remote processing devices that are linked through a communications network. In a distributed computing environment, program modules can be located in both local and remote computer storage media including memory storage devices.

An exemplary system for implementing aspects of the presently disclosed subject matter can include a general purpose computing device in the form of a computer 241. Components of computer 241 can include, but are not limited to, a processing unit 259, a system memory 222, and a system bus 221 that couples various system components including the system memory to the processing unit 259. The system bus 221 can be any of several types of bus structures including a memory bus or memory controller, a peripheral bus, and a local bus using any of a variety of bus architectures.

Computer 241 typically includes a variety of computer readable media. Computer readable media can be any available media that can be accessed by computer 241 and includes both volatile and nonvolatile media, removable and non-removable media. By way of example, and not limitation, computer readable media can comprise computer storage media and communication media. Computer storage media can include both volatile and nonvolatile, removable and non-removable media implemented in any method or technology for storage of information such as computer readable instructions, data structures, program modules or other data. Computer storage media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media can embody computer readable instructions, data structures, program modules or other data in a modulated data signal such as a carrier wave or other transport mechanism and includes any information delivery media.

The term "modulated data signal" can correspond to a signal that has one or more of its characteristics set or changed in such a manner as to encode information in the signal. By way of example, and not limitation, communication media can include wired media such as a wired network or direct-wired connection, and wireless media such as acoustic, RF, infrared and other wireless media. Combinations of the any of the above should also be included within the scope of computer readable media. Moreover, as was suggested above, computer readable media can be embodied in tangible media.

The system memory 222 can include computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 can typically contain data and/or program modules that are immediately accessible to and/or presently being operated on by processing unit 259. By way of example, and not limitation, FIG. 7 illustrates operating system 225, application programs 226, other program modules 227, and program data 228.

The computer 241 can also include other removable/non-removable, volatile/nonvolatile computer storage media. By way of example only, FIG. 7 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 7, provide storage of computer readable instructions, data structures, program modules and other data for the computer 241. In FIG. $7_m$ for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user can enter commands and information into the computer 241 through input devices such as a keyboard 251 and pointing device 252, commonly referred to as a mouse, trackball or touch pad. Other input devices (not shown) can include a microphone, joystick, game pad, satellite dish, scanner, or the like. These and other input devices are often connected to the processing unit 259 through a user input interface 236 that s coupled to the system bus, but can be connected by other interface and bus structures, such as a parallel port, game port or a universal serial bus (USB). A monitor 242 or other type of display device is also connected to the system bus 221 via an interface, such as a video interface 232. In addition to the monitor, computers can also include other peripheral output devices such as speakers 244 and printer 243, which can be connected through a output peripheral interface 233.

The computer 241 can operate in a networked environment using logical connections to one or more remote computers, such as a remote computer 246. The remote computer 246 can be a personal computer, a server, a router, a network PC, a peer device or other common network node, and typically includes many or all of the elements described above relative to the computer 241, although only a memory storage device 247 has been illustrated in FIG. 7. The logical connections depicted in FIG. 7 include a local area network (FAN) 245 and a wide area network (WAN) 249, but can also include other networks. Such networking environments are commonplace in offices, enterprise-wide computer networks, intranets and the Internet.

When used in a FAN networking environment, the computer 241 is connected to the FAN 245 through a network interface or adapter 237. When used in a WAN networking environment, the computer 241 typically includes a modem 250 or other means for establishing communications over the WAN 249, such as the Internet. The modem 250, which can be internal or external, can be connected to the system bus 221 via the user input interface 236, or other appropriate mechanism. In a networked environment, program modules depicted relative to the computer 241, or portions thereof, can be stored in the remote memory storage device. By way of example, and not limitation, FIG. 7 illustrates remote application programs 248 as residing on memory device 247. It will be appreciated that the network connections shown are exemplary and other means of establishing a communications link between the computers can be used.

It should be understood that the various techniques described herein can be implemented in connection with hardware or software or, where appropriate, with a combination of both. Thus, the methods and apparatus of the presently disclosed subject matter, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs that can implement or utilize the processes described in connection with the presently disclosed subject matter, e.g., through the use of an API, reusable controls, or the like. Such programs are preferably implemented in a high level procedural or object-oriented programming language to communicate with a computer system. However, the program(s) can be implemented in assembly or machine language, if desired. In any case, the language can be a compiled or interpreted language, and combined with hardware implementations.

Although exemplary embodiments can refer to utilizing aspects of the presently disclosed subject matter in the context of one or more stand-alone computer systems, the said subject matter is not so limited, but rather can be implemented in connection with any computing environment, such as a network or distributed computing environment. Still further, aspects of the presently disclosed subject matter can be implemented in or across a plurality of processing chips or devices, and storage can similarly be effected across a plurality of devices. Such devices might include personal computers, network servers, handheld devices, supercomputers, or computers integrated into other systems such as automobiles and airplanes.

In light of the diverse computing environments that can be built according to the general framework provided in FIG. 7, the systems and methods provided herein cannot be construed as limited in any way to a particular computing architecture. Instead, the presently disclosed subject matter should not be limited to any single embodiment, but rather should be construed in breadth and scope in accordance with the appended claims. Moreover, any of the abovementioned components can be, shown is an exemplary networked computing environment in which many computerized processes can be implemented to perform the processes described above. For example, parallel computing can be part of such a networked environment with various clients on the network of FIG. 8 using and/or implementing the defining and extracting of a flat list of search properties from a rich structured type. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing, such as the one mentioned with respect to FIG. 7, provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices can have applications, objects or resources that can implicate the processes described herein.

Figure 8:
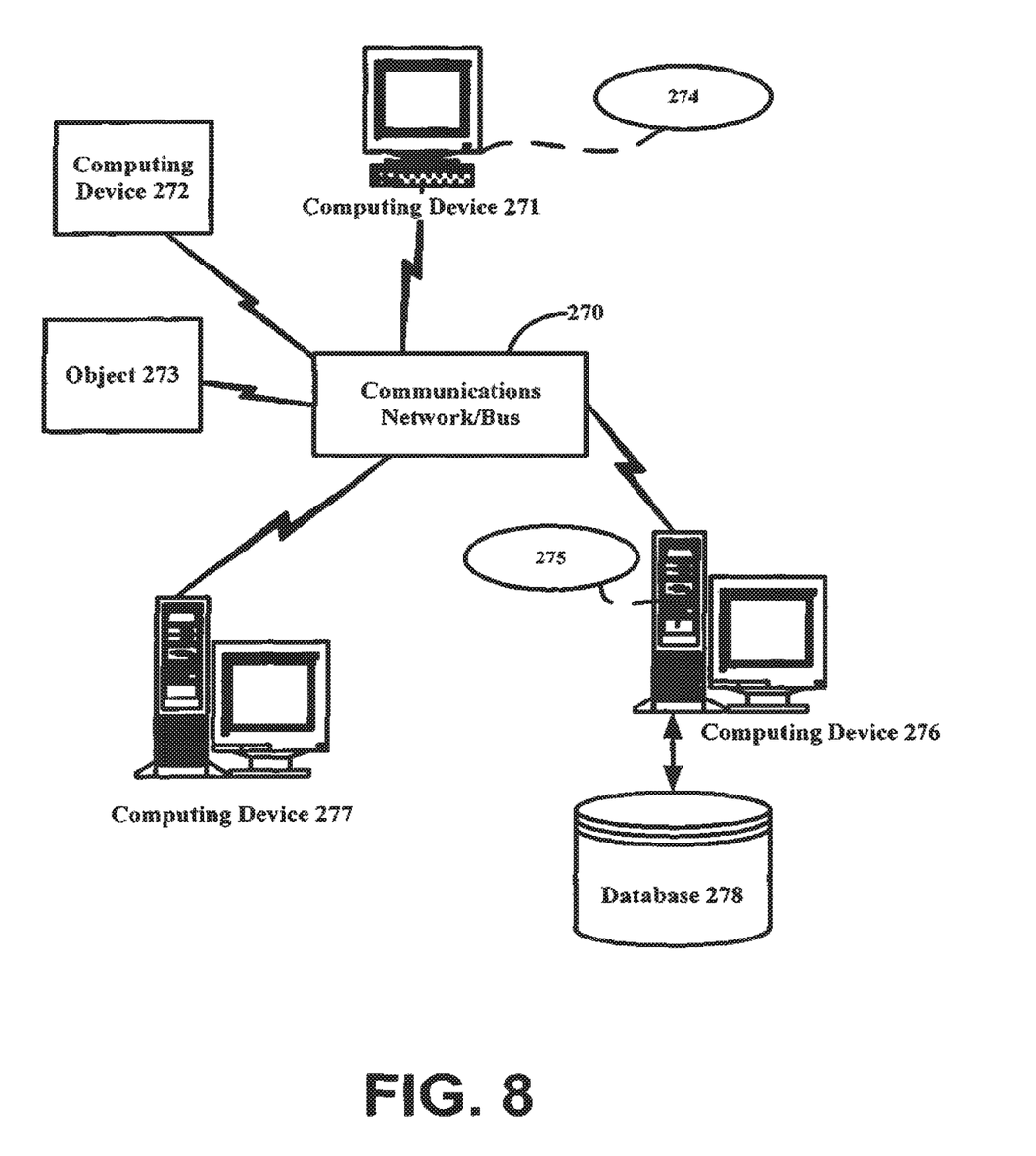
FIG. 8 illustrates an exemplary networked computing environment in which many computerized aspects may be implemented to perform the aforementioned functions.

FIG. 8 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 can comprise or make use of programs, methods, data stores, programmable logic, etc. The entities 271, 272, 273, 274, 275, 276, 277 and 278 can span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity, module, or device can be responsible for the maintenance and updating of a database 278 or other storage element.

This network 270 can itself comprise other computing entities that provide services to the system of FIG. 8, and can itself represent multiple interconnected networks. In accordance with an aspect of the presently disclosed subject matter, each entity 271, 272, 273, 274, 275, 276, 277 and 278 can contain discrete functional program modules that might make use of an API, or other object, software, firmware and/or hardware, to request services of one or more of the other entities 271, 272, 273, 274, 275, 276, 277 and 278.

It can also be appreciated that an object, such as 275, can be hosted on another computing device 276. Thus, although the physical environment depicted can show the connected devices as computers, such illustration is merely exemplary and the physical environment can alternatively be depicted or described comprising various digital devices such as PDAs, televisions, MP3 players, etc., software objects Such as interfaces, COM objects and the like.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks. Any such infrastructures* whether coupled to the Internet or not, can be used in conjunction with the systems and methods provided.

A network infrastructure can enable a host of network topologies such as client/server, peer-to-peer, or hybrid architectures. The "client" can be a member of a class or group that uses the services of another class or group to which it is not related. In computing, a client can be a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 8, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process can be active in a first computer system, and the server process can be active in a second computer system, communicating with one another over a communications medium, thus providing distributed functionality and allowing multiple clients to take advantage of the information-gathering capabilities of the server. Any software objects can be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., chent(s) and served s) can be coupled to one another via TCP/IP connection(s) for high-capacity communication.

In light of the diverse computing environments that can be built according to the general framework provided in FIG. 8 and the further diversification that can occur in computing in a network environment such as that of FIG. 8, the systems and methods provided herein cannot be construed as limited in any way to a particular computing architecture or operating system. Instead, the presently disclosed subject matter should not be limited to any single embodiment, but rather should be construed in breadth and scope in accordance with the appended claims.

Lastly, while the present disclosure has been described in connection with the preferred aspects, as illustrated in the various figures, it is understood that other similar aspects can be used or modifications and additions can be made to the described aspects for performing the same function of the present disclosure without deviating therefrom. For example, in various aspects of the disclosure, mechanisms for sending and receiving encrypted messages were disclosed. However, other equivalent mechanisms to these described aspects are also contemplated by the teachings herein. Therefore, the present disclosure should not be limited to any single aspect, but rather construed in breadth and scope in accordance with the appended claim.

What we claim is:

1. A method comprising:
generating, by a server, a first submessage comprising content stored onto a first computer;
generating, by the server, a second submessage comprising randomly generated data unrelated to the content;
encrypting, by the server, the first submessage and the second submessage;
transmitting, by the server, the encrypted first submessage to a second computer via a first path of a network;
transmitting, by the server, the encrypted second submessage to the second computer via a second path of the network; and
transmitting, by the server, an encryption key to the second computer via a third path of the network, the encryption key indicating that the encrypted second submessage, encrypted by the server, comprises the randomly generated data unrelated to the content, the encryption key indicating a decrypting algorithm to decrypt the encrypted first submessage, wherein the second computer recreates the content by decrypting the encrypted first submessage.

2. The method of claim 1, wherein the server further transmits one or more copies of at least one of the first submessage or the second submessage to the second computer.

3. The method of claim 2, wherein one or more copies of at least one of the first submessage or the second submessage are indistinguishable from the encrypted first submessage or the encrypted second submessage without the encryption key.

4. The method of claim 2, wherein when the second computer receives more than one copy of one of the encrypted first submessage and the encrypted second submessage, the second computer decrypts a copy that is not corrupted.

5. The method of claim 1, wherein the network comprises a public network.

6. The method of claim 1, wherein the first path, the second path and the third paths are different paths associated with different network connections.

7. The method of claim 1, wherein the encryption key is transmitted to the second computer at a different time than at least one of the encrypted first submessage or the encrypted second submessage.

8. The method of claim 1, wherein the first submessage or the second submessage are transmitted to the second computer in real time or in a batched manner.

9. The method of claim 1, wherein the first computer, the second computer and the server are different communication devices.

10. A computer system comprising:
a first computer;
a second computer;
and a server in communication with the first computer and the second computer, the server configured to:
generate a first submessage comprising content;
generate a second submessage comprising randomly generated data unrelated to the content;
encrypt the first submessage and the second submessage;
transmit the encrypted first submessage to the second computer via a first path of a network;
transmit the encrypted second submessage to the second computer via a second path of the network; and
transmit an encryption key to the second computer via a third path of the network, the encryption key indicating that the encrypted second submessage comprises the randomly generated data unrelated to the content the encryption key indicating a decrypting algorithm to decrypt the encrypted first submessage wherein the second computer recreates the content by decrypting the encrypted first submessage.

11. The system of claim 10, wherein the server further transmits one or more copies of at least one of the first submessage or the second submessage to the second computer.

12. The system of claim 11, wherein one or more copies of at least one of the first submessage or the second submessage are indistinguishable from the encrypted first submessage or the encrypted second submessage without the encryption key.

13. The system of claim 11, wherein when the second computer receives more than one copy of the first encrypted submessage, the second computer decrypts a copy that is not corrupted.

14. The system of claim 10, wherein the network comprises a public network.

15. The system of claim 10, wherein the second computer further recreates the content by disregarding the encrypted second submessage.

16. The system of claim 10, wherein the first path, the second path and the third paths are different paths associated with different network connections.

17. The system of claim 10, wherein the encryption key is transmitted to the second computer at a different time than at least one of the encrypted first submessage or the encrypted second submessage.

18. The system of claim 10, wherein the first submessage or the second submessage are transmitted to the second computer in real time or in a batched manner.

19. A non-transitory computer-readable medium storing instructions that when executed by a processor effectuate:
generating a first submessage comprising content;
generating a second submessage comprising randomly generated data unrelated to the content;
encrypting the first submessage and the second submessage;
transmitting the encrypted first submessage to a second computer via a first path of a network;
transmitting the encrypted second submessage to the second computer via a second path of the network; and
transmitting an encryption key to the second computer via a third path of a network, the encryption key indicating that the encrypted second submessage comprises the randomly generated data unrelated to the content, the encryption key indicating a decrypting algorithm to decrypt the encrypted first submessage, wherein the second computer recreates the content by decrypting the encrypted first submessage.

20. The non-transitory computer-readable medium of claim 19, wherein the instructions when executed by the processor effectuate:
transmitting one or more copies of at least one of the first submessage or the second submessage to the second computer.

21. The non-transitory computer-readable medium of claim 20, wherein when the second computer receives more than one copy of the first encrypted submessage, the second computer decrypts a copy that is not corrupted.

22. The non-transitory computer-readable medium of claim 19, wherein the second computer further recreates the content by disregarding the encrypted second submessage and wherein the first path, the second path and the third paths are different paths associated with different network connections.

* * * * *